United States Patent [19]

Magill et al.

[11] Patent Number: 4,531,534
[45] Date of Patent: Jul. 30, 1985

[54] SPRING-POWERED ACTUATOR

[75] Inventors: Robert J. Magill, Tankerton; David J. Gaiger, Kingsdown; Neil Simkins, Ashby-de-la-Zouch, all of England

[73] Assignee: Actionair Equipment Limited, Whitstable, England

[21] Appl. No.: 440,309

[22] Filed: Nov. 9, 1982

[30] Foreign Application Priority Data

Nov. 10, 1981 [GB] United Kingdom ............... 8133852
May 26, 1982 [GB] United Kingdom ............... 8215444

[51] Int. Cl.³ .................................. E05F 15/20
[52] U.S. Cl. ................................. 137/75; 137/556; 137/601; 49/7; 49/8
[58] Field of Search ............ 137/75, 601, 556; 49/7, 49/8; 251/130, 133, 134

[56] References Cited

U.S. PATENT DOCUMENTS

| | | | |
|---|---|---|---|
| 3,323,438 | 6/1967 | Korff | 49/8 |
| 3,830,016 | 8/1974 | Levine | 49/8 |
| 4,184,288 | 1/1980 | Magill et al. | 137/601 |
| 4,304,248 | 12/1981 | Magill | 137/75 |
| 4,333,489 | 6/1982 | Magill et al. | 137/77 |

FOREIGN PATENT DOCUMENTS 2316513 1/1977 France ................. 137/75

Primary Examiner—A. Michael Chambers
Attorney, Agent, or Firm—Berman, Aisenberg & Platt

[57] ABSTRACT

A spring-powered actuator especially for operating devices such as fire and/or smoke dampers, doors, hatches, vents, traps, valves and other devices having components which are movable between at least two positions. The spring-powered actuator of the invention comprises a longitudinally-displaceable re-wind screw which is rotatable to recharge the spring of the actuator, and a tilting element on the screw which is mounted for tilting movement with respect to the screw axis to allow longitudinal movement of the re-wind screw so as to permit rapid and reliable release of energy stored in the spring. When used in a combination fire and smoke damper, it thus opens or closes the blades of the latter.

19 Claims, 29 Drawing Figures

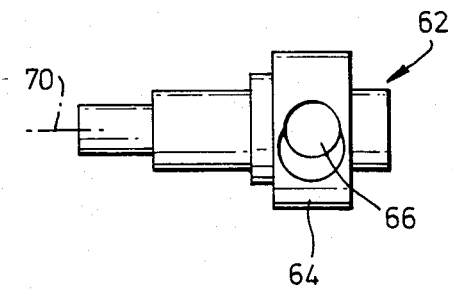
Fig. 8.
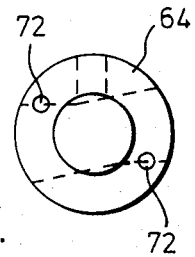
Fig. 9.
Fig. 10.
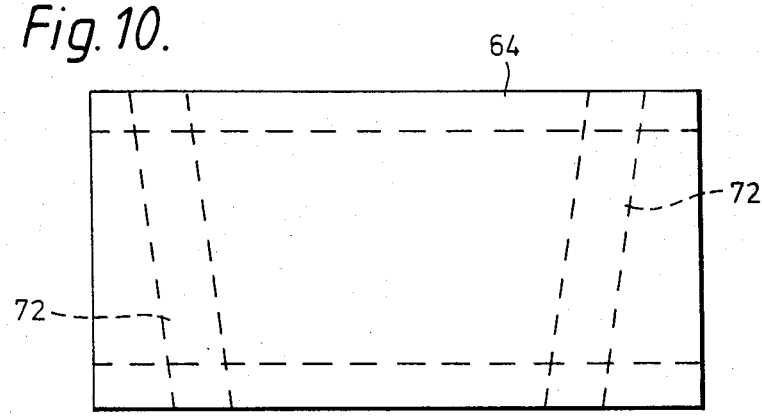
Fig. 11.
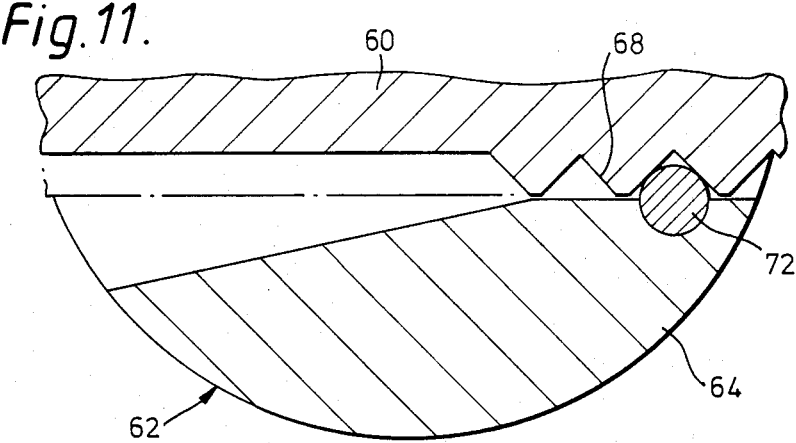

4,531,534

SPRING-POWERED ACTUATOR

BACKGROUND OF THE INVENTION

This invention relates to spring-powered actuators, and is especially concerned with spring-powered actuators for operating devices such as fire and/or smoke dampers, doors, hatches, vents, traps, valves and other devices having components which are movable between at least two positions (usually a closed position and an open position). The invention is particularly advantageous when used in combination fire and smoke dampers of the kind having interlocking aerofoil blades arranged for swivelling movement about parallel axes into and out of a position in which they close a through-passage in the damper.

One requirement of a spring-powered actuator is that provision must be made for "re-charging" the spring after its energy has been released (or partially released). Another need is for a reliable release mechanism to be provided so that the stored energy of the spring can be released without any risk of the release mechanism jamming or failing to operate. Accordingly, with these two requirements in mind, a spring-powered actuator in accordance with the present invention comprises a longitudinally-displaceable re-wind screw which is rotatable to re-charge the spring, a tilting element having at least one projecting member which is arranged to engage the thread on the re-wind screw to hold the latter against longitudinal displacement, and release means for releasing the tilting element in order to allow the projecting member to be disengaged from the thread thereby allowing the re-wind screw to be displaced longitudinally under the power of the spring.

In one form of spring-powered actuator in accordance with the invention, the projecting member on the tilting element is a needle roller of the kind used in roller bearings, the diameter of the needle roller being so small as to allow the needle to enter the gap between two successive turns on the thread of the lead screw. Preferably, the tilting element has two such elements located at equal distances on opposite sides of its tilting axis. Although a needle roller is the preferred form of projecting member, it is also possible for the projecting member to be in the form of a ball, spigot, ridge or other projection capable of entering the gap between two turns of the thread on the lead screw. If desired, the tilting element can take the form of a nut the threads of which act as "projecting members" to engage the thread of the re-wind screw.

From another aspect, the invention is directed to a damper assembly comprising a damper adapted to be fitted in a duct, and a gear box and spring-powered actuator of the construction described above arranged to be mounted on or near the duct adjacent the damper, the main parts of the actuator being housed in a box which is removably and pivotally mounted on a bracket which can be readily fixed to the duct close to the damper to be actuated by the actuator.

Fire and/or smoke dampers invariably incorporate fusible links which melt when the temperature rises above a certain level so as to trigger operation of the spring-release means. Where that is the case, the present invention provides, according to another one of its aspects, for the fusible link and the spring-release means to be connected together by a scissors linkage. Preferably, the scissors linkage is pivotally supported on a suitable mounting plate secured to the casing of the actuator.

The re-wind screw can be rotated by hand and/or by motor to re-charge the spring, the motor being a pneumatic, hydraulic, electric or electro-magnetic motor according to choice. Where an electric motor is used, a reduction gear will be necessary between the motor shaft and the re-wind screw. According to another aspect of the invention, this reduction gear includes a spur wheel having an enlarged boss carrying three rollers which roll on a hexagonal-section portion of a spindle coupled by a collar or sleeve to the re-wind screw. The reduction gear is preferably encased in a shallow gear box formed by bringing together two shallow trays having inter-fitting rims or flanges.

In many cases the actuator will, in fact, have an electric motor to re-wind the screw and there will be other electrical components in the actuator. To control these components a printed circuit board is, according to another aspect of the invention, removably and resiliently supported in the casing of the actuator, the resilient support for the circuit board preferably comprising a springy-wire suspension system which is anchored by being trapped between two opposing parts of the casing.

According to another aspect of the invention, the extent to which the blades in the damper are opened is controlled by a switch which is adjustable with respect to a shoulder or other part on the lead screw, there being indicating means to indicate the extent to which the blades are open at any particular instance. This particular feature allows the damper blades to be held in a partially open position and not just the fully open position which is cuttomary in such dampers.

In order that the invention may be thoroughly understood, some examples of combination fire and smoke damper assemblies embodying it will now be described with reference to the accompanying drawings, in which:

FIG. 8 is a side view of the tilting element which co-operates with the lead screw in the actuator;

FIG. 9 is an end view of the tilting element shown in FIG. 8;

FIG. 10 is an enlarged outside view of the main part of the tilting element;

FIG. 11 is a schematic sectional view illustrating the relationship between the threads of the lead screw and a thread-engaging needle roller on the tilting element;

Figure 1:
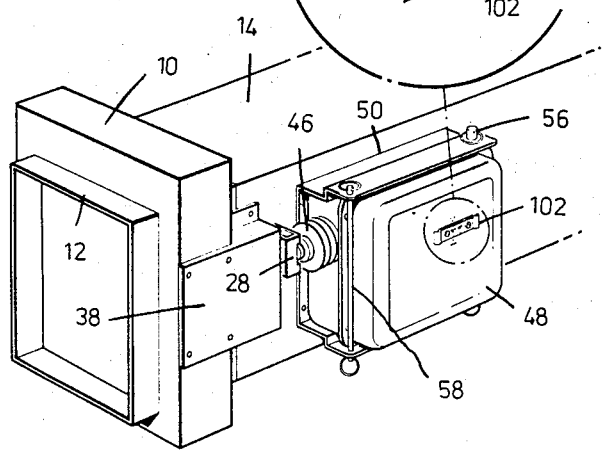
FIG. 1 is a perspective view of one form of damper assembly mounted in or on a duct.

The spring-powered actuators shown in the drawings are specifically designed to operate the pivotally-movable blades of fire and/or smoke dampers. Dampers of this construction are shown in published U.K. Specification No. 2,032,053 and in various other patents. The actual damper construction will not therefore be described here.

The following considerations have been taken into account in designing the new actuators:

1. Each actuator needs to provide for a rapid variation in the position of the damper blades between a fully-open position and a fully-closed position.
2. It needs to provide for the damper to "fail safe" instantly at any time.
3. The whole principle of release is to be a "let go" mechanism, i.e., it is unnecessary to apply a releasing force additional to that already in the spring energy store. This is achieved by the effect of a "wedge action" which is the flank angle of the screw thread on the re-wind screw. The result is that a force is required to hold the tilting element in its "hold" position, but the release of that force and the shape of the thread causes the tilting element to tilt out of the way, so effecting a "fail safe" release.
4. It needs to respond and close the damper blades whenever the flexible cartridge/link melts or where there is failure of an electrical supply/signal as a result of smoke detection or control operation.
5. If the actuator shuts the damper blades by operation of the fusible cartridge, the actuator must be rendered inoperable until the cartridge is replaced, except in certain circumstances where a special cartridge is used instead.
6. If the actuator shuts the damper blades by any other input, provision shall be made for the actuator to be reset remotely.

With these considerations to the fore, the actuators and damper assemblies shown in the drawings will now be described in detail.

The damper assembly shown in FIGS. 1–11 comprises a combination fire and smoke damper with a rectangular frame 10 having flanges 12 which are received within and mate with ducting 14 as used in the ventilation systems of buildings or ships. A passage through the damper is controlled by a number of blades arranged on parallel axes so that they can be rotated to interlock with one another and thus close the passage to prevent fluid passing through the damper. The blades themselves are not shown in the drawings, but a typical damper of this construction is shown in published British Specification No. 2,032,053A. That specification also shows the drive mechanism for the blades, the drive mechanism being in the form of rotary discs, one for each blade, which are connected together by one or more longitudinal movable drive bars so that the discs can be rotated in unison with each other.

Figure 3:
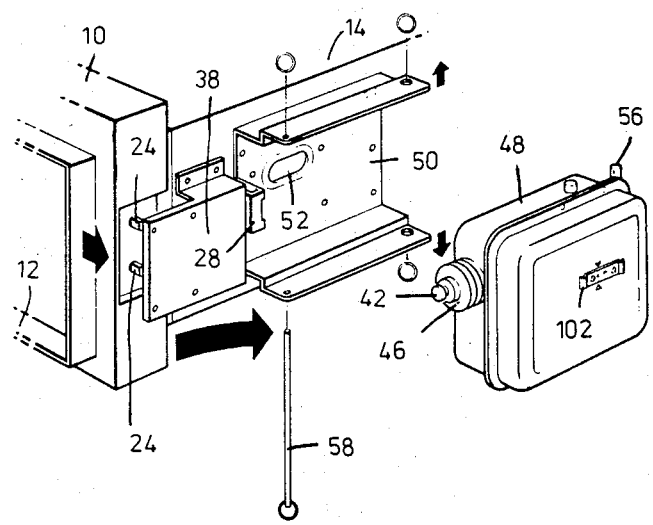
Figure 4:
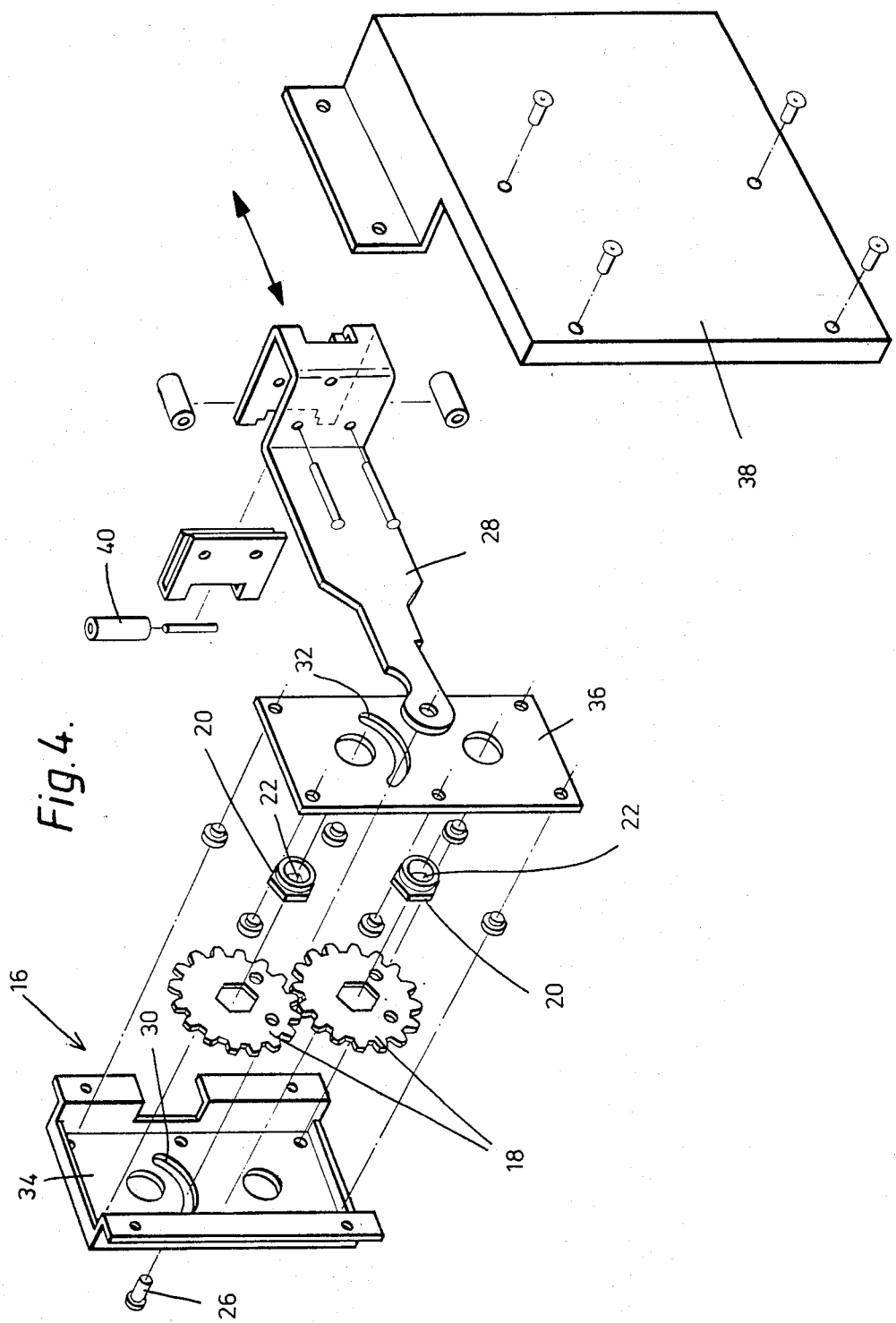
FIG. 4 is an exploded perspective view of the gear bos forming part of the assembly.

The above-described drive mechanism is operated by drive means through a gear box 16 which is shown in exploded perspective view in FIG. 4. As will be seen, the gear box contains two meshing gear wheels 18 which are carried on respective stub shafts 20 having rectangular slots 22 which receive the corresponding rectangular section shafts 24 (see FIG. 3) of two of the damper blades. A pin 26 connects one of the gear wheels 18 to a link member 28, the pin 26 being arranged to move over an arc within slots 30 and 32 provided on opposite walls 34 and 36 of the gear box. It therefore follows that movement of the link member 28 back and forth in the direction of the double-headed arrow shown in FIG. 4 causes the blades in the dampers to be moved between their open and closed positions.

The gear box 16 is so constructed as to lie externally of the damper casing 10 so that it can be readily removed from the damper as and when required. This is in contrast with earlier dampers of this general construction where the gear box is contained internally in the damper and cannot therefore be removed very easily, if at all.

The gear box 16 and the link member 28 are carried by a protective housing 38 which is rivetted or otherwise fixed to the damper housing 10 and to the adjoining duct 14. A roller 40 is carried on one end of the link member 28 so as to roll over the surface of the duct 14. This reduces friction between the link member 28 and the duct 14 as the link member is moved back and forth in a longitudinal direction.

Figure 5:
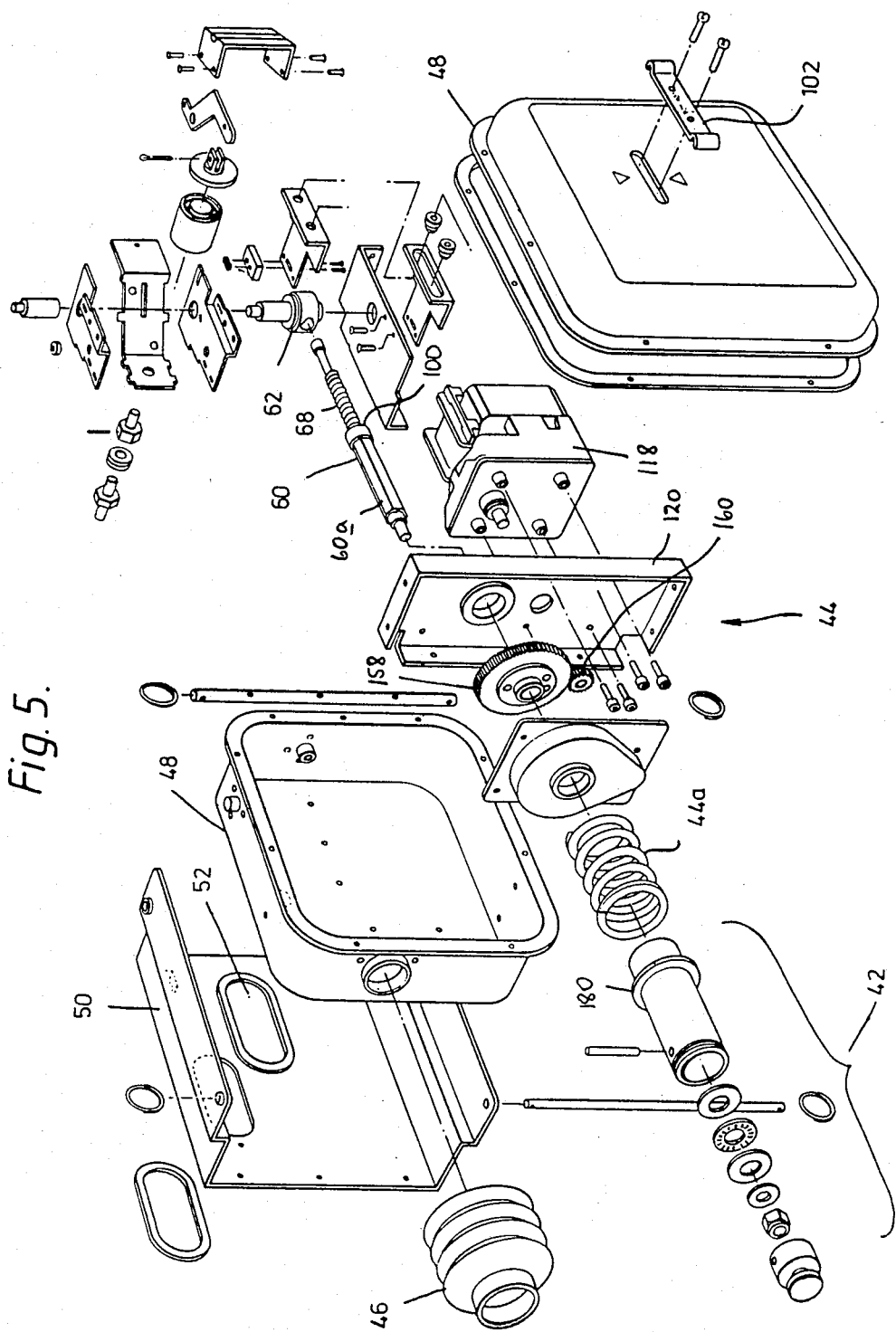
FIG. 5 is an exploded perspective view of the main parts of the spring-powered actuator forming part of the assembly.
Figure 6:
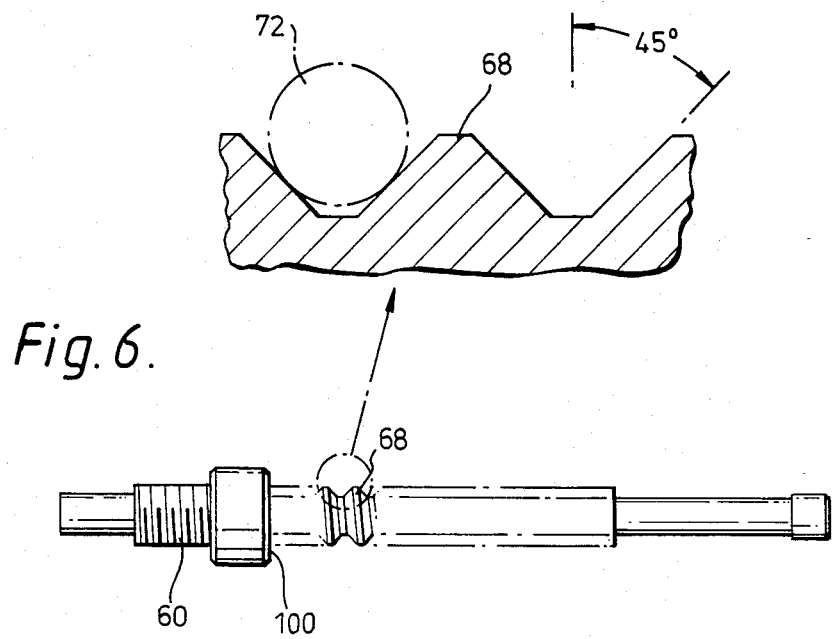
FIG. 6 is a side view of the rear part of the lead screw in the actuator.
Figure 7:
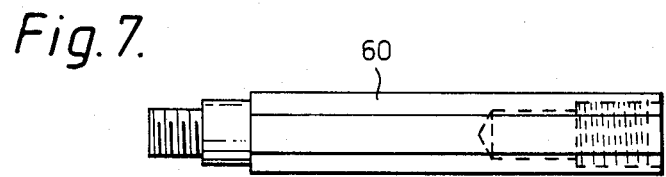
FIG. 7 is a side view of the front part of the lead screw in the actuator.

The end of the link member 28 remote from the gear box 16 is connected by connecting means 42 shown in FIG. 5 to the spring-powered actuator 44 shown in exploded form in that Figure. The connecting means 42 are protected by a bellows 46, while the remaining parts of the actuator are contained in a box 48 made up of two deep flanged trays which are fastened together. The actual construction of the box can be seen clearly in FIGS. 1–3 as well as in FIG. 5.

Hitherto it has been the practice to mount the box 48 on a length of duct in the factory and to send that somewhat bulky piece of equipment to the site. As can be imagined, lengths of ducting can take up a large space in a lorry and it is therefore an aim of the present invention to arrange for the box 48 to be mounted on the duct on site and not in the factory. For this purpose, the box 48 of the spring-powered actuator is pivotally and removably mounted on a bracket 50 which can be very simply rivetted or bolted to a duct on site. The bracket includes a small access opening 52 to permit a fusible element 54 (see FIG. 2) to project into the duct 14. It will therefore be appreciated that a corresponding hole which matches the opening 52 will also need to be cut in the duct 14 when the bracket is being fitted.

The box 48 of the actuator is pivotally supported on the bracket 50 by a pivot rod 56 which can easily be removed as shown in FIG. 3 of the drawings.

Figure 2:
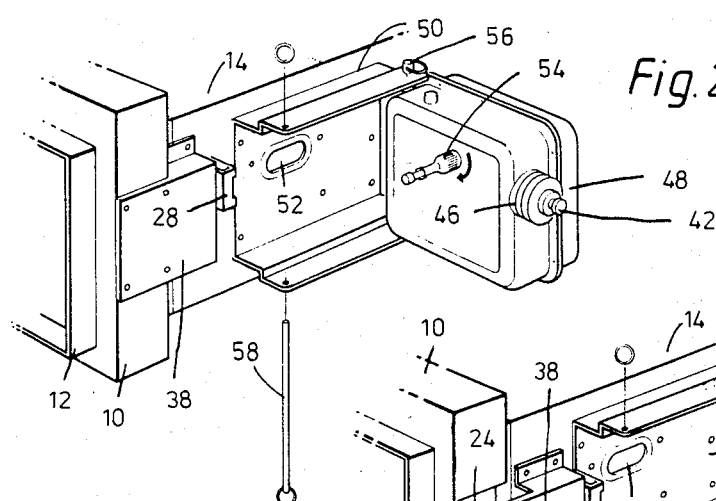
FIGS. 2 and 3 are views similar to FIG. 1 showing various parts in different positions.

A second rod 58 serves to hold the box in its normal position on the duct as shown in FIG. 1, but this rod likewise can be removed as shown in FIG. 2 to allow the box 48 to swing on the pivot rod 56, thereby allowing the fusible element 54 to be inspected or changed. It will also be observed that the connecting means 42 are so designed that they can be readily disconnected from the link member 28 shown in FIG. 4.

In order to re-charge the spring 44a of the actuator 44, a re-wind or lead screw 60 is provided as shown in FIG. 5. It is shown in greater detail in FIGS. 6 and 7 from which it will be seen that the lead screw is actually formed of a front spindle and a rear spindle which are connected together by a screw thread. The lead screw 60 co-operates with a tilting element 62 (see FIGS. 8–10) having a main cylindrical portion 64 provided with a through-bore 66 containing the screw threaded part 68 of the lead screw 60. The element 62 is mounted for tilting movement about the axis 70 and has two needle rollers 72 received in bore holes which cut into the through-bore 66 so that the needle rollers 72 form projections in that bore 66. The diameter of the needle rollers is such that they are each able to enter a gap between adjacent turns of the screw thread 68 of the lead screw 60. The tilting element 62 therefore has two projecting members (the needle rollers) which engage the screw thread of the re-wind or lead screw 60.

It is not essential to provide needle rollers as the means which engage the screw thread of the lead screw. It would, for example, be equally possible to use projections in the form of balls, spigots or ridges which project into the bore 66 of the tilting element 62 so as to have the same function as the needle rollers 72.

The actuator 44 is made ready for operation by having its re-wind or lead screw 60 rotated in the tilting element 62 so that the spring 44a of the actuator is compressed and thus "charged" for action. Rotation of the screw 60 causes the screw to move to the right, with the result that a flange 180 on a bearing 165 forming the major part of the connecting means 42 moves towards a gear box 120 and compresses the spring 44a. Such rotation of the screw 60 is normally effected by the electric motor 118 which drives the screw 60 through a pinion 160 which meshes with a spur wheel 158 in driving engagement with the hexagonal-section front portion 60a of the screw.

FIG. 11 illustrates the theory lying behind the tilting arrangement described above. By providing the screw threads on the lead screw 60 with a 4 mm pitch and a 45° angle thread, a needle roller of 3/32" diameter can be provided on a tilting element having a diameter for the cylindrical portion 64 of 1". FIG. 11 shows that the arc over which the tilt element operates is such that it can be moved clear of the screw thread without "binding" on the latter when quick release of the lead screw is desired in order to close the damper blades.

Figure 12:
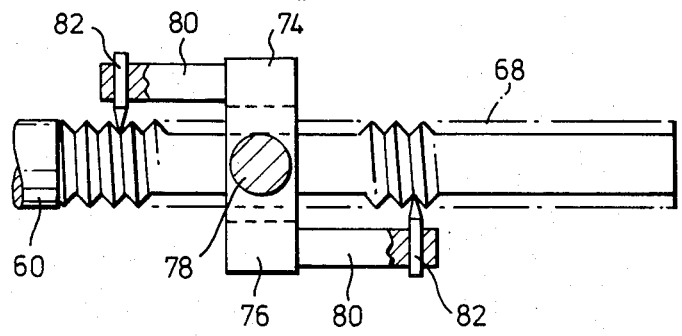
FIG. 12 illustrates an alternative form of tilting element in side view.
Figure 13:
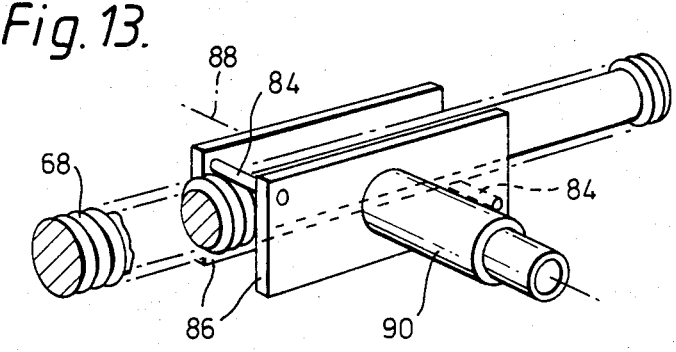
FIG. 13 is a perspective view of another alternative form of tilting element.

FIGS. 12 and 13 illustrate diagrammatically two alternative forms of tilting element. The tilting element 74 shown in FIG. 12 comprises a ring 76 which can be tilted on a shaft 78, the ring having two arms 80 which project in opposite directions from its two side faces. The outer portions of these two arms carry pins or thin wedges 82 which are adapted to engage the gap between two adjacent turns on the screw thread 68 of the lead screw 60.

In the case of FIG. 13, two needle rollers 84 are carried by two parallel plates 86 which are arranged one on each side of the screw thread 68 of the lead screw. The plates 86 are arranged for tilting movement about the axis 88 on a shaft 90. As in the case of the tilting element shown in FIGS. 8–10, the needle rollers 84 are each adapted to enter the gap between two adjacent turns of the screw thread 68.

Figure 14:
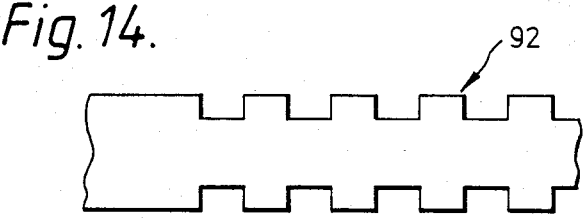
FIG. 14 is a side view of a rack which is an alternative to the lead screw shown in previous Figures.
Figure 15:
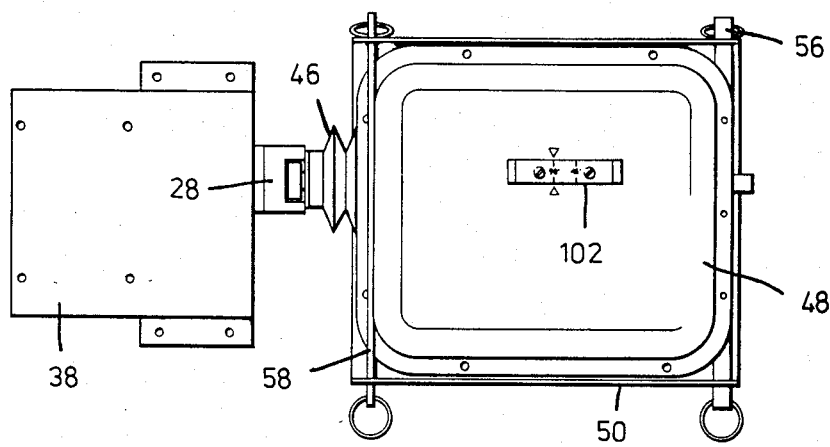
FIG. 15 is a plan view of the actuator box and associated parts as mounted on the duct.
Figure 16:
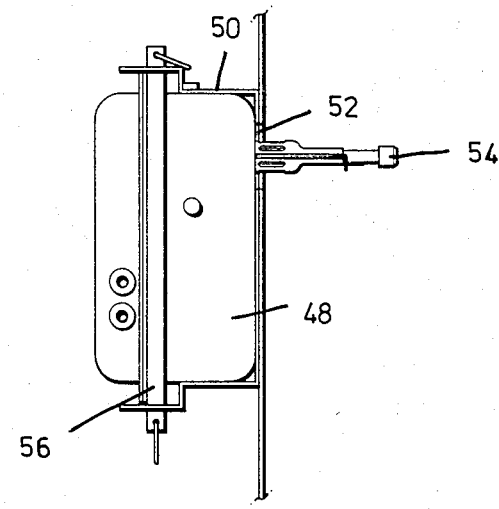
FIG. 16 is an end view of the actuator box showing a fusible element mounted thereon.

Although it is preferable for the spring-powered actuator to incorporate a lead screw such as that shown at 60 in the drawings, it is possible for an alternative such as a rack to be used, and this is illustrated at 92 in FIG. 14.

Figure 17:
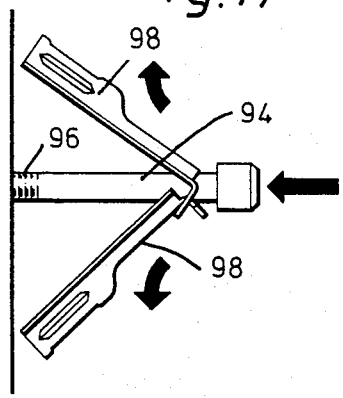
FIGS. 17 and 18 are enlarged side views, in exploded form, illustrating the construction of the fusible element shown in FIG. 16.
Figure 18:
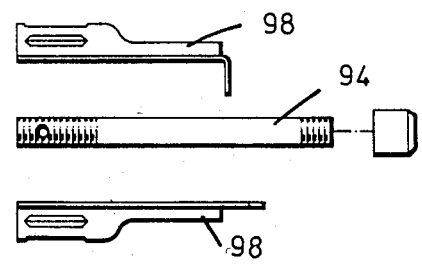

Reference has already been made to the mounting of the fusible element 54 on the box 48 of the spring-powered actuator. FIGS. 17 and 18 illustrate the construction of the fusible element from which it will be seen that it comprises a shaft 94 having a screw thread 96 which permits it to be screwed into the box 48 of the actuator. Carried on the shaft are two interfitting cover portions 98 which are soldered or otherwise connected together by a fusible metal. Accordingly, when the temperature in the duct 14 rises above a certain predetermined level, the solder or other easily melted metal holding the two cover portions 98 together will melt, thereby allowing the two cover portions 98 to fly apart as shown in FIG. 17. This then causes the lead screw 60 to be released by the tilting element 62 so that the spring of the actuator acts to move the link member 28 and thus rotate the blades of the damper into their closed positions.

The angle through which the element 62 tilts to cause release of the lead screw 60 will generally be quite a small angle, for example, about 12°. It may also be possible in certain instances for the element 62 to be made non-tiltable, but for the lead screw 60 to be tilted in order to achieve the same result.

In certain instances, it is highly desirable for the opening and closing of the damper blades to be so controlled that they can be set in any one of a number of intermediate positions between the fully open and fully closed positions. This can be ensured by providing a microswitch which is contacted by a shoulder 100 on the lead screw 60. When this microswitch is operated it stops the screw from being rotated by shutting off the electrical supply to the re-wind motor, with the result that the blades of the damper are held in a partially open position. The precise position can be seen visually by the indicating means 102 provided on the outside of the box 48 of the actuator, and these indicating means also include provision for adjusting the location of the microswitch.

FIGS. 19–29 show an alternative form of actuator in accordance with the invention, as well as illustrating in greater detail some of the constructional features omitted from FIGS. 1–18 for the sake of clarity.

Figure 22:
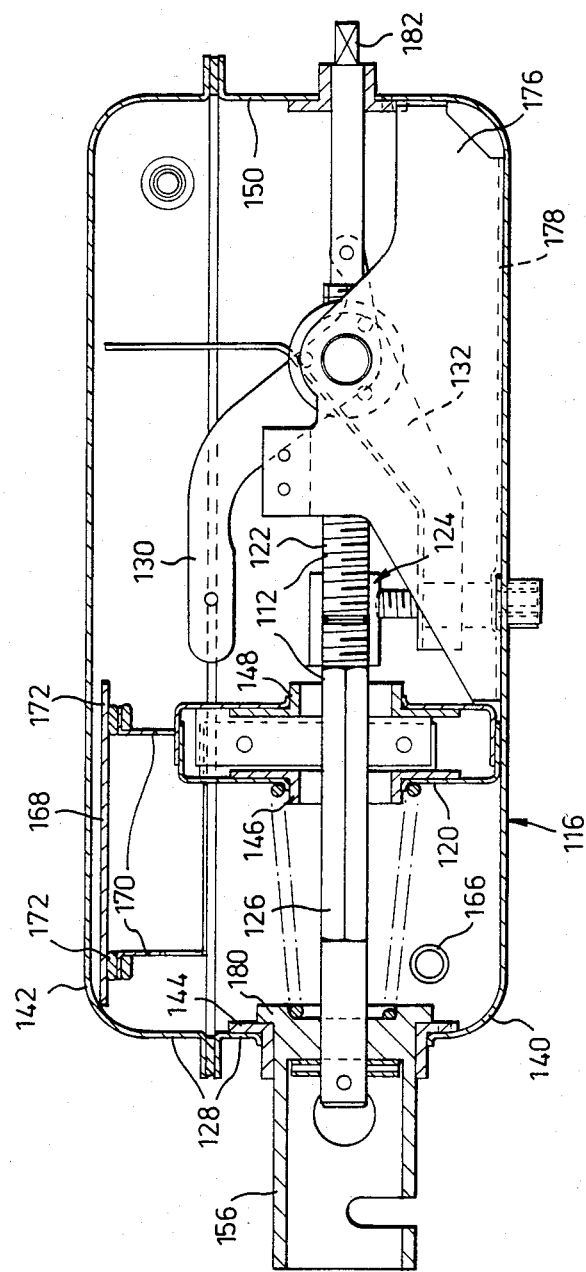
FIG. 22 is a horizontal section similar to FIG. 19 to illustrate additional or modified parts of the actuator.
Figure 23:
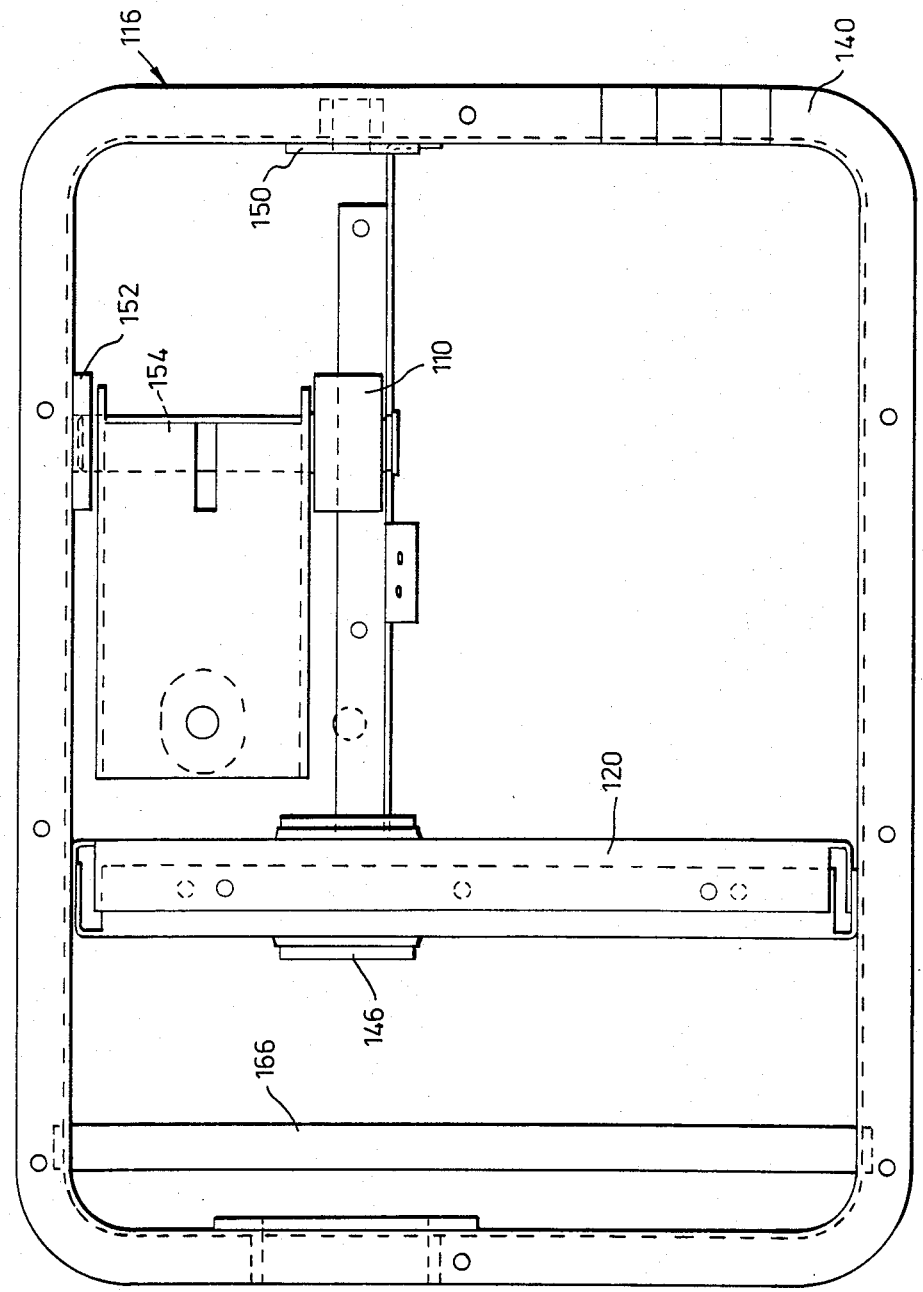
FIG. 23 is a vertical section similar to FIG. 20 to illustrate other or modified parts of the actuator.
Figure 24:
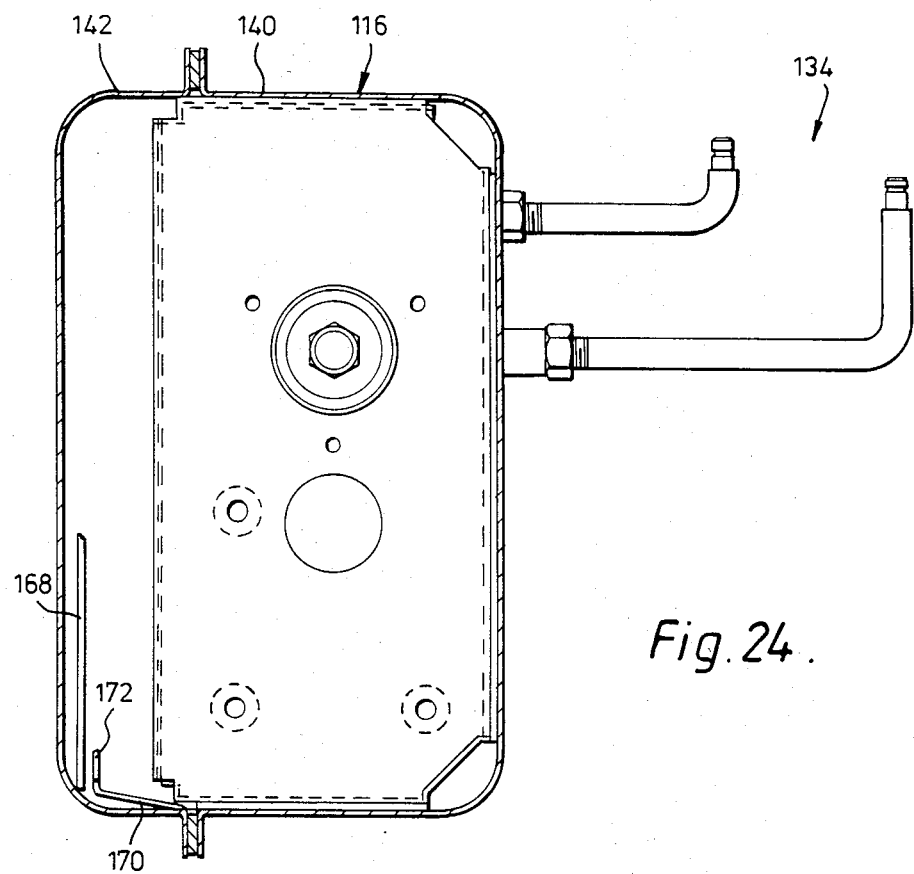
FIG. 24 is another vertical section similar to FIG. 21.
Figure 25:
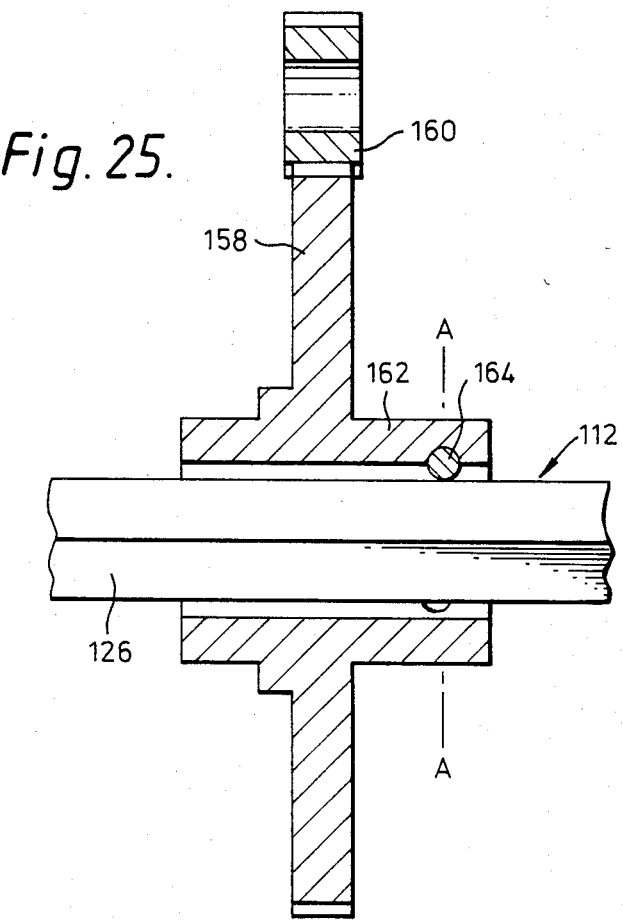
FIG. 25 is an enlarged section through one part of the actuator shown in FIG. 19.
Figure 26:
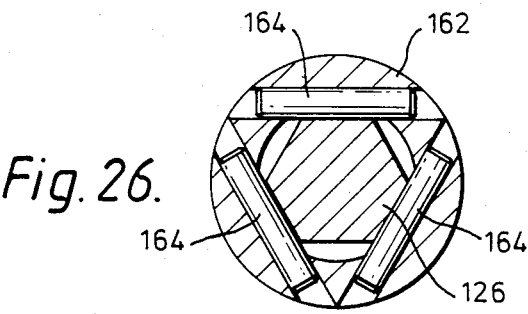
FIG. 26 is a section taken on the line A—A in FIG. 25.
Figure 27:
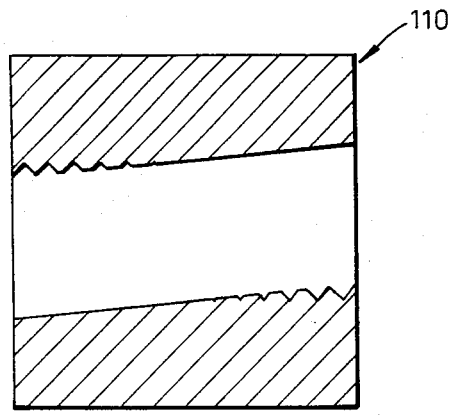
FIG. 27 is an enlarged exploded view in perspective of the tilting nut provided in the actuator of FIG. 19.
Figure 28:
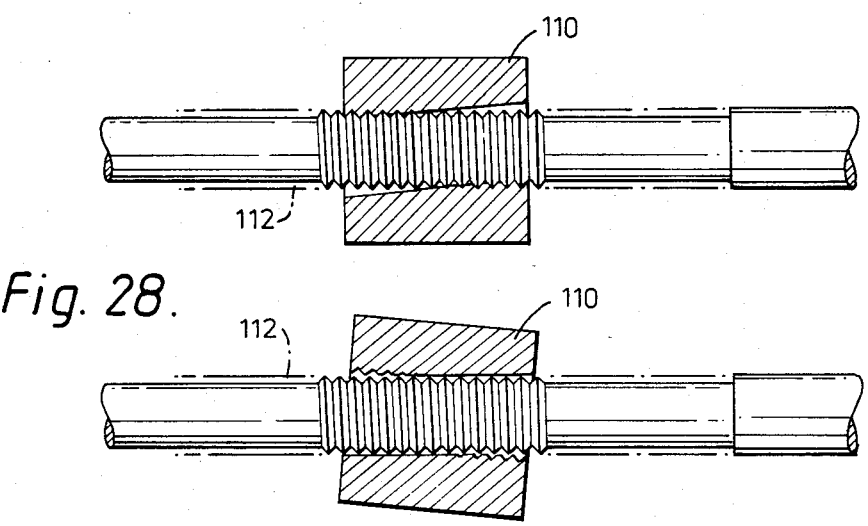
FIG. 28 is a horizontal section through the nut shown in FIG. 27 with its re-wind screw.

Instead of having a tilting element provided with projecting members in the form of needle rollers as in FIGS. 1–18, the spring-powered damper blade actuator shown in FIGS. 19–29 is constructed as a remote control module designed around the principle of a tilting nut 110 arranged to co-operate with a re-wind lead screw 112 by which the coil spring 114 of the actuator can be re-charged. These and other components are located in a totally-enclosed box 116 having an electric motor 118 and a gear box 120. The re-wind screw 112 extends through the tilting nut 110 and comprises a rear spindle 112 joined by a collar or sleeve 124 to a front spindle 126. The spring 114 to close the damper blades is contained between the gear box 120 and a swivel bearing 156 in the front wall 128 of the box 116. To activate the spring and release its stored energy, the nut 110 is tilted, thereby releasing the re-wind screw 112. Tilting of the nut is achieved through interlocked levers 130 and 132 arranged in scissors formation which connect the nut assembly to a fusible link 134, a hold coil 138 and a solenoid 136. The gear box 120 is shown in FIGS. 22 and 23 as being of different construction from that shown in FIGS. 19–21, the gear box in FIGS. 22 and 23 being formed of two shallow metal trays having inter-fitting rims or flanges.

The box 116 is made in two parts and comprises a deep-drawn stainless steel main tray 140 which is closed by a lid 142 of similar design, the two parts 140 and 142 being rivetted together. Where the re-wind screw 112 passes through openings in the main box 116 and the gear box 120, brass bushes 144, 146, 148 and 150 are rivetted to the surrounding structure. A further brass bush 152 is provided for a swivel shaft 154 on the tilting nut 110.

The front portion of the spindle 126 is received in a swivel bearing 156 containing a thrust bearing, the spindle 126 being machined from hexagonal bar and having a hexagonal-section portion which passes through the gear box 120. The gear box contains a spur wheel 158 (see FIG. 25) in meshing engagement with a motor drive pinion 160, the spur wheel having an enlarged boxx 162 to carry the front spindle 126 and rotate it by means of three hardened steel rollers 164 set in the spur wheel boss. As will be seen from FIG. 26, these rollers roll on three of the flat faces on the hexagonal-section portion of the spindle.

Attachment of the box 116 to ducting containing the damper is effected by a transverse steel rube 166 at the front of the box and by two turned screws in bushes fitted to the lid 142 at the rear of the box. In order to control the electrical components of the actuator, a printed circuit board 168 is secured by a resilient system of two formed springy wires 170, four gromets 172 and four rivets 174 into pressed recesses in the lid 142. The flying leads are fitted with long tail gromets and are clamped by the action of lid closure and rivetting. Internal wiring is clipped by sticky back clips in the lid, and the lid is also pierced to receive local electrical controls or leads.

The tilting nut shaft 154 has lever 130 fastened to it and serves as a pivot for lever 130. The whole sub-assembly is pivotally mounted on an elongate mounting plate or bracket 176 having an extended base portion 178 which is firmly secured to a wall of the main box 116.

As already indicated above, the function of the spring-powered actuator is to close the damper blades in a fire and/or smoke damper arranged in a duct. Such dampers are frequently provided nowadays in the air-conditioning ducts of large buildings to help prevent the spread of fire throughout the building should fire break out in it.

The actuator is accordingly mounted, in practice, on the outside of a duct near to a damper so as to have the swivel bearings 156 (or a part associated therewith) connected by an arm or strap (not shown) to means on the damper for closing the blades of the latter. The actuator is made ready for operation by having its re-wind or lead screw 112 rotated in the nut 110 so that the spring 114 of the actuator is compressed and thus "charged" for action. Rotation of the screw 112 causes the screw to move to the right, with the result that the flange 180 on the swivel bearing 156 moves towards the gear box 120 and compresses the spring. Such rotation of the screw 112 is normally effected by the electric motor 118 which drives the screw 112 through the pinion 160, the spur wheel 158, and the rollers 164 which roll on the flat surfaces on the hexagonal-section portion of the spindle 126 forming the front part of the screw 112. It is also possible, however, for the screw 112 to be rotated manually by a hand wheel which can be slipped on and off the projecting square end 182 of the rear spindle 122.

As the shaft 112 moves to the rear during the above spring-charging operation, it will of course open the blades of the damper because of the connection between those blades and the swivel bearing 156.

In regard to the hold/release action of the unit, it is to be noted that the swivel shaft 154 is an integral part of the tilting nut 110 and that the lever 130 is located on this shaft by a D-shaped hole (in the lever 130) and is secured to the shaft with a small weld. The lever 132 is free to rotate about the shaft 154 and is fitted with solenoid 136 which has a long travel, high force and short energisation period. In contrast, the hold coil 138 is merely an electro-magnet which has a long energisation period.

In operation of the actuator, with the fusible link in position, an electrical signal to open the blades of the damper causes energisation of the motor 118 solenoid 136 and electro-magnet hold coil 138. (The lever 132 is fixed by the fusible link and cannot move). The solenoid 136 pulls the lever 130, the tilting nut 110 and the electro-magnet hold coil armature 138a into wind or change position (i.e., rotating approximately 8° anti-clockwise in FIG. 19). The screw 112 advances to the right until a micro-switch is operated by the joining collar 124. The motor 118 and the solenoid 136 are de-energised, and the module is now primed, holding on fusible link 134 and the hold coil 138.

A signal to close the damper blades can take place in the following circumstances:

1. Fusible link melts

Figure 19:
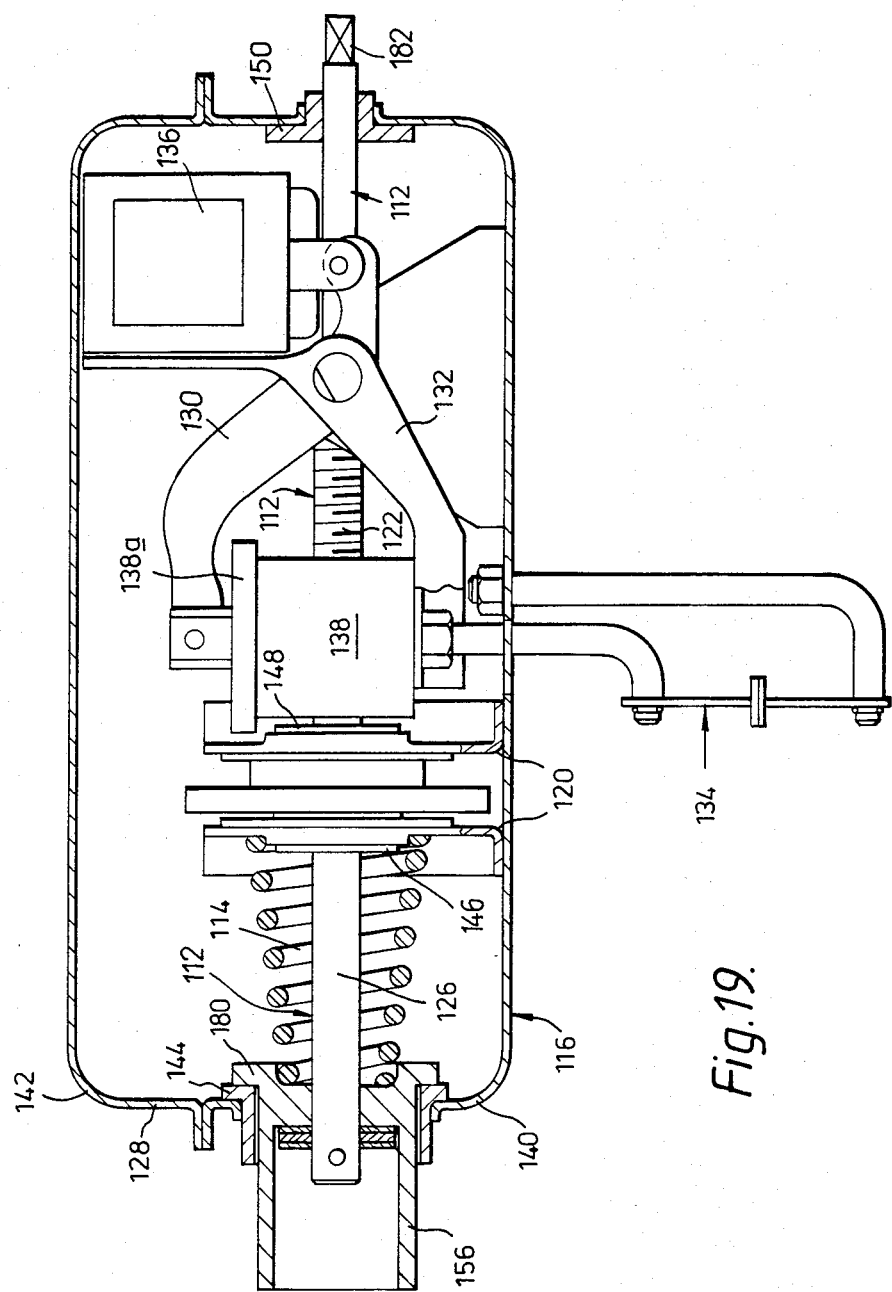
FIG. 19 is a horizontal section through a second form of actuator in accordance with the invention.
Figure 20:
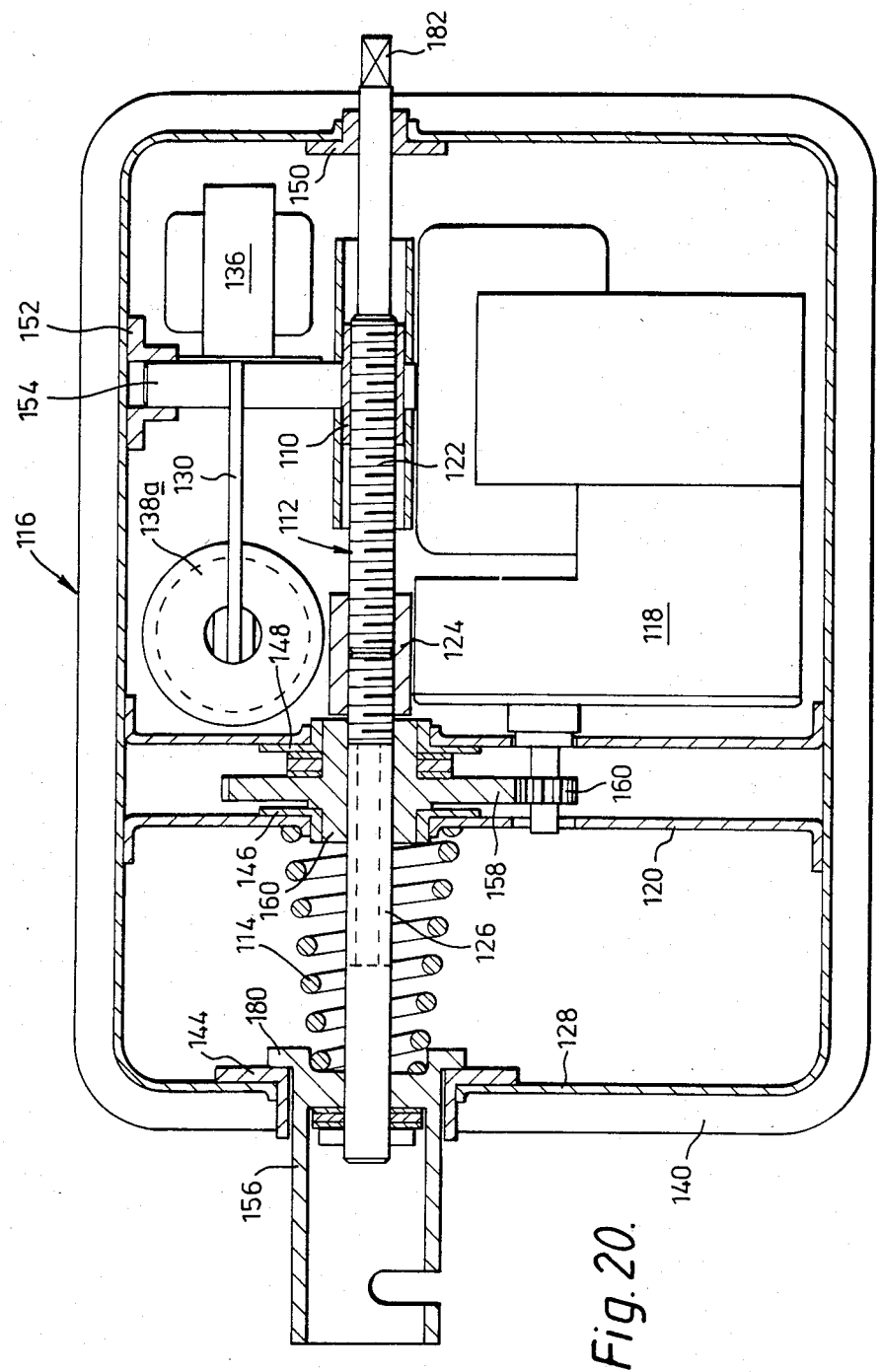
FIG. 20 is a vertical section through the actuator of FIG. 19.
Figure 21:
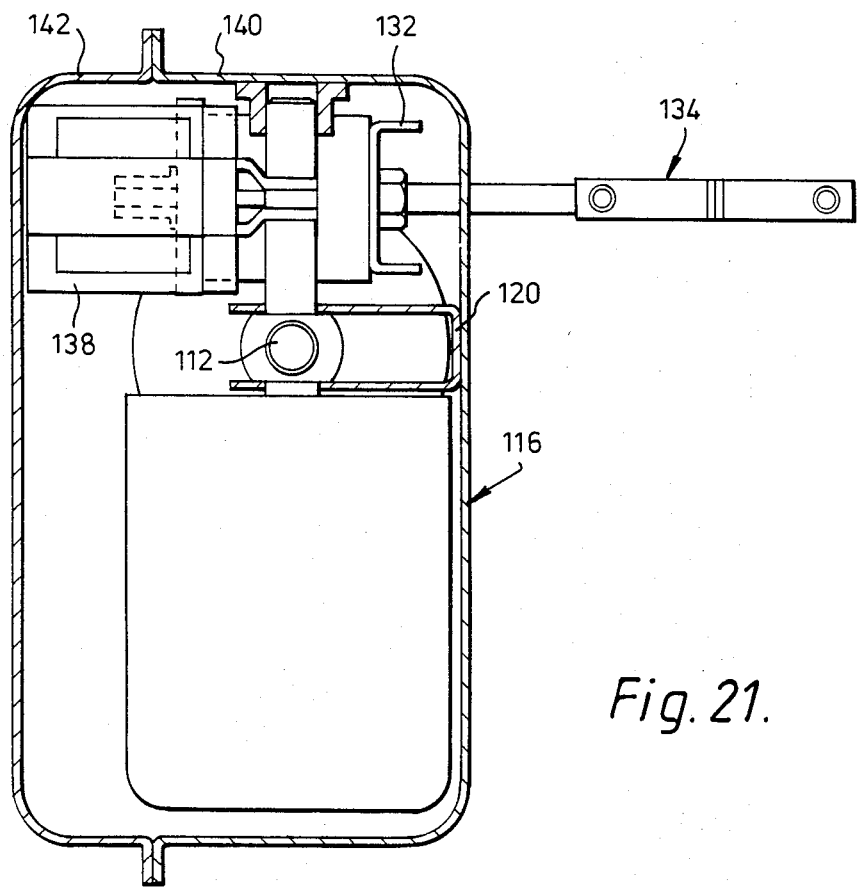
FIG. 21 is a vertical section at right-angles to FIG. 20.

Melt-out of the link 134 permits release of the screw 112 entirely independently of the electrical elements of the system by allowing the whole scissors mechanism to move approximately 8° clockwise (FIG. 19). This permits rotation of the nut 110 by way of components 138, 138a, 130, 136, 154 and 132 all maintaining their relative positions but pivoting in the bearing trunion 120 and hence allowing free movement of the screw.

2. Electrical signal to close

This signal can be generated by various means—for example, a smoke alarm, a janitor's maintenance check or a mains supply failure. The effect, however, is the same and results in supply interruption to the electromagnet hold coil 138. This releases the hold coil armature 138a and permits rotation of components 130, 110 and the armature of solenoid 136 through approximately 8° clockwise, so effecting a release of the screw. The lever 132 does not move in this particular instance.

3. Manual release

In those cases where it is desired, there can be manual release which is triggered by the fusible link automatically and with the aid of a push button. The charging is then done by a portable lever. In this instance all the electrical equipment and drive can be removed, the hold coil 138 being replaced by a mechanical linkage which permits the necessary movements and contol to be achieved by a push button located in the lid of the box 116.

Laboratory tests made on an actuator in accordance with the invention have shown it to be extremely reliable, which is a vital requirement in damper equipment. Further, it is basically simple to manufacture and has a minimum of moving parts or parts which might become displaced or damaged in use.

Figure 29:
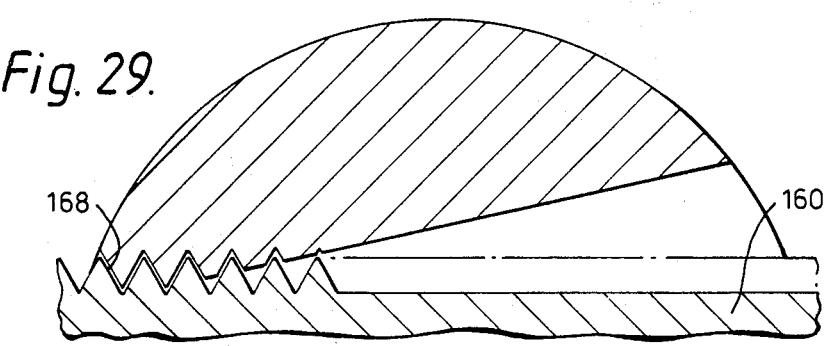
FIG. 29 is an enlarged view, similar to FIG. 11, showing the relationship between a different form of screw thread on the re-wind screw and an alternative form of tilting nut.

FIG. 29 illustrates the theory lying behind the tilting nut arrangement described in FIGS. 19–28. We have ascertained that, where such a tilting nut is used, care must be taken to ensure that the arc of movement of the effective thread portions on the tilting nut must not be so small as to cause "binding" of its screw threads on the screw thread of the lead screw. This is illustrated by FIG. 29 which shows that, when a M 10 thread is used for the lead screw, the effective threads on the tilt nut need to be located a distance of approximately 1" from the tilting axis.

We claim:

1. A spring-powered actuator for operating at least one component which is movable between at least two positions said actuator comprising component-actuating means adapted to be connected to said component so as to move the latter, spring means acting on said component-actuating means as a source of power to urge said component-actuating means into a component-moving position, a screw-threaded longitudinally displaceable re-wind screw mounted for rotation to re-charge said spring means after said spring means have been used to power movement of said component, a tilting element mounted for tilting movement with respect to said re-wind screw, at least one projecting member on said tilting element arranged to engage said screw-thread of said re-wind screw to hold said screw against longitudinal displacement, and release means for releasing said tilting element whereby said projecting member thereon is disengaged from the screw-thread of said re-wind screw as said tilting element tilts, thereby allowing the re-wind screw to be displaced longitudinally under the power of said spring means to effect movement of said component.

2. An actuator according to claim 1, in which said spring means comprise a coil spring arranged co-axially of said re-wind screw.

3. An actuator according to claim 1, in which said re-wind screw is made in two parts fastened end to end to form an elongate spindle.

4. An actuator according to claim 1, in which the projecting member on the tilting element is a needle roller the diameter of which is sufficiently small to allow the needle to enter the gap between two successive turns on the thread of the re-wind screw.

5. An actuator according to claim 4 having two needle rollers which are located at equal distances on opposite sides of the tilting axis of the tilting element.

6. An actuator according to claim 1, in which the projecting member on the tilting element is a ball having a diameter small enough to allow the ball to enter the gap between two successive turns on the thread of the re-wind screw.

7. An actuator according to claim 1, in which the projecting member on the tilting element is a spigot the tip of which is small enough to allow the spigot to enter the gap between two successive turns on the thread of the re-wind screw.

8. An actuator according to claim 1, in which the projecting member on the tilting element is a ridge the apex of which is small enough to allow the ridge to enter a gap between two successive turns on the thread of the re-wind screw.

9. An actuator according to claim 1, in which the tilting element is in the form of a screw-threaded nut having portions of the screw thread removed, the threads which remain serving as projecting members to engage the thread of the re-wind screw.

10. An actuator according to claim 1, in which the said release means include a hold solenoid the energisation of which causes the solenoid to hold the tilting element in a position where the projecting member thereon engages the screw thread of the re-wind screw to prevent longitudinal displacement of the screw under the power of the spring whereby de-energisation of said solenoid allows said tilting element to tilt, thereby releasing the re-wind screw and allowing the screw to be displaced in a longitudinal direction by the spring.

11. An actuator according to claim 1, in which a motor is connected to the re-wind screw so as to rotate the screw under power in order to re-charge the spring.

12. An actuator according to claim 1, in which the re-wind screw is connected to an electric motor for the purpose of rotating the screw, a reduction gear being provided between the shaft of the motor and the re-wind screw.

13. An actuator according to claim 12, in which the reduction gear includes a spur wheel having an enlarged boss carrying rollers which roll on a polygonal-section portion of a spindle coupled to the re-wind screw.

14. An actuator according to claim 12, in which the reduction gear is encased in a shallow gear box formed by bringing together two shallow trays having interfitting arms or flanges.

15. An actuator according to claim 1 comprising electrical components the control of which is effected by a printed circuit board removably and resiliently supported in a casing of the actuator.

16. An actuator according to claim 15, in which the resilient support for the circuit board comprises a springy-wire suspension system which is anchored by being trapped by two opposing parts of the actuator casing.

17. An actuator according to claim 1, in which the release means is connected by a scissors linkage to a fusible link sensitive to a rise in temperature for the purpose of triggering operation of the release means.

18. An actuator according to claim 1 for use with a damper having movable blades, in which the actuator includes a switch the position of which is adjustable with respect to a shoulder on the re-wind screw in order to give an indication of the extent to which the blades in the damper are open, there being indicating means to indicate visually the extent to which the blades are open at any particular instance.

19. An actuator according to claim 1, in which the casing of the actuator is pivotally and removably mounted on a bracket adapted to be attached to a duct, the bracket having an access opening to permit a fusible element on the actuator casing to project into the duct.

* * * * *